(12) United States Patent
Yang (10) Patent No.: US 10,760,976 B2
(45) Date of Patent: Sep. 1, 2020

(54) THERMAL IMAGING OF HEAT SOURCES IN THERMAL PROCESSING SYSTEMS

(71) Applicants: Mattson Technology, Inc., Fremont, CA (US); Beijing E-Town Semiconductor Technology Co., Ltd., Beijing (CN)

(72) Inventor: Michael X. Yang, Palo Alto, CA (US)

(73) Assignees: MATTSON TECHNOLOGY, INC., Fremont, CA (US); BEIJING E-TOWN SEMICONDUCTOR TECHNOLOGY CO., LTD., Beijing (CN)

( * ) Notice: Subject to any disclaimer, the term of this patent is extended or adjusted under 35 U.S.C. 154(b) by 139 days.

(21) Appl. No.: 15/951,291

(22) Filed: Apr. 12, 2018

(65) Prior Publication Data
US 2019/0316972 A1   Oct. 17, 2019

(51) Int. Cl.
| | |
|---|---|
| G01J 5/10 | (2006.01) |
| G01K 7/00 | (2006.01) |
| G01J 5/50 | (2006.01) |
| G01K 15/00 | (2006.01) |
| G01J 5/16 | (2006.01) |
| G01J 5/02 | (2006.01) |
| G01J 5/00 | (2006.01) |

(52) U.S. Cl.
CPC .............. G01K 7/003 (2013.01); G01J 5/02 (2013.01); G01J 5/16 (2013.01); G01J 5/505 (2013.01); G01K 15/005 (2013.01); *G01J 2005/0048* (2013.01); *G01J 2005/0081* (2013.01)

(58) Field of Classification Search
CPC ...... G01K 15/005; G01K 7/003; G01K 11/32; G01K 11/3213; H01L 21/67248; C23C 16/4404; C23C 16/545
USPC ....... 374/120, 121, 178, 1, 2, 137, 124, 110, 374/112, 126
See application file for complete search history.

(56) References Cited

U.S. PATENT DOCUMENTS

5,902,504 A  *  5/1999  Merchant .......... H01L 21/67098
                                                    219/505
6,164,816 A  *  12/2000  Aderhold .............. G01J 5/0003
                                                    374/1

(Continued)

FOREIGN PATENT DOCUMENTS

JP        2004296625 A   * 10/2004
KR    20010047142 A   *  6/2001

*Primary Examiner* — Gail Kaplan Verbitsky
(74) *Attorney, Agent, or Firm* — Dority & Manning, P.A.

(57) ABSTRACT

Thermal imaging of heat sources in thermal processing systems for determination of workpiece temperature are provided. In one example, a thermal processing apparatus can include a processing chamber, a workpiece support, a plurality of heat sources configured to heat a workpiece, and at least one camera. The at least one camera can capture one or more images of thermal radiation of the plurality of heat sources during thermal treatment of the workpiece. In one example, a method for calibrating the camera can include obtaining the one or more images of thermal radiation of at least one heat source, obtaining one or more reference signals indicative of irradiation of the at least one heat source, and calibrating the camera based at least in part on a comparison between the one or more images of thermal radiation and the one or more reference signals indicative of irradiation of the heat source.

20 Claims, 5 Drawing Sheets

(56) References Cited

U.S. PATENT DOCUMENTS

| | | | | |
|---|---|---|---|---|
| 6,179,466 B1* | 1/2001 | Peuse | | G01J 5/0818 |
| | | | | 374/128 |
| 6,479,801 B1* | 11/2002 | Shigeoka | | G01J 5/0003 |
| | | | | 219/502 |
| 6,847,012 B1* | 1/2005 | Hauf | | G01J 5/0003 |
| | | | | 118/724 |
| 7,276,696 B2* | 10/2007 | Remillard | | G02B 23/12 |
| | | | | 250/330 |
| 7,323,399 B2* | 1/2008 | Demos | | C23C 16/26 |
| | | | | 257/E21.242 |
| 7,844,171 B2* | 11/2010 | Kubo | | H01L 21/67248 |
| | | | | 219/395 |
| 9,324,591 B2* | 4/2016 | Yoshii | | H01L 21/67248 |
| 9,933,314 B2* | 4/2018 | Petry | | H05B 1/0233 |
| 2003/0193987 A1* | 10/2003 | Zalameda | | G01N 25/72 |
| | | | | 374/5 |
| 2004/0047394 A1* | 3/2004 | Shibata | | G01K 11/00 |
| | | | | 374/132 |
| 2005/0063451 A1* | 3/2005 | Abe | | G02B 7/181 |
| | | | | 374/121 |
| 2005/0205773 A1* | 9/2005 | Fauci | | G12B 13/00 |
| | | | | 250/252.1 |
| 2009/0040367 A1* | 2/2009 | Zakrzewski | | B64D 45/0015 |
| | | | | 348/370 |
| 2015/0055940 A1* | 2/2015 | Steinhauser | | H01L 21/6831 |
| | | | | 392/307 |
| 2015/0131698 A1* | 5/2015 | Vellore | | G01J 5/505 |
| | | | | 374/130 |
| 2015/0316473 A1* | 11/2015 | Kester | | G06K 9/00624 |
| | | | | 250/339.02 |
| 2016/0025801 A1* | 1/2016 | Kim | | G01R 31/2601 |
| | | | | 324/750.03 |
| 2018/0269089 A1* | 9/2018 | Merchant | | H05B 1/02 |
| 2019/0113398 A1* | 4/2019 | Comas | | B29C 64/264 |

* cited by examiner

THERMAL IMAGING OF HEAT SOURCES IN THERMAL PROCESSING SYSTEMS

FIELD

The present disclosure relates generally to thermal processing systems.

BACKGROUND

A thermal processing chamber as used herein refers to a device that can heat a workpiece(s), such as a semiconductor wafer. The device can include a support plate for supporting the workpiece(s) and an energy source for heating the workpiece(s), such as heating lamps, lasers, or other heat sources. During heat treatment, the workpiece(s) can be heated under controlled conditions to a preset temperature regime. For instance, the workpiece(s) can be heated by an array of lamps through the support plate to temperatures of, for instance, from about 300° C. to about 1,200° C., for times that can be typically less than a few minutes in rapid thermal processing. During heat treatment, a primary goal can be to measure a workpiece temperature as precisely as possible.

SUMMARY

Aspects and advantages of embodiments of the present disclosure will be set forth in part in the following description, or may be learned from the description, or may be learned through practice of the embodiments.

One example aspect of the present disclosure is directed to a thermal processing apparatus. The thermal processing apparatus can include a processing chamber, a workpiece support, a plurality of heat sources (e.g., lamp arrays, laser, or other heat sources) configured to heat a workpiece in the processing chamber, and at least at least one camera. The at least one camera can be configured to capture one or more images of thermal radiation of the plurality of heat sources during thermal treatment of the workpiece.

Another example aspect of the present disclosure is directed to a method for determining a temperature of a workpiece in a thermal processing chamber. The method can include heating the workpiece with a plurality of heat sources, capturing one or more images of thermal radiation of the plurality of heat sources with at least one camera, accessing a thermal model associated with the thermal processing chamber based at least in part on the one or more images of thermal radiation, obtaining one or more outputs of the thermal model based at least in part on the one or more images of thermal radiation, and determining the temperature of the workpiece based at least in part on the one or more outputs.

Yet another example aspect of the present disclosure is directed to a method for calibrating a camera in a thermal processing chamber. The camera can be configured to capture images of thermal radiation of a plurality of heat sources used to heat a workpiece during thermal processing of the workpiece in the thermal processing chamber. The method can include obtaining one or more images of thermal radiation of at least one heat source of the plurality of heat sources with the camera, obtaining one or more reference signals indicative of irradiation of the at least one heat source, and calibrating the camera based at least in part on a comparison between the one or more images of thermal radiation and the one or more reference signals indicative of irradiation of the at least one heat source.

Other example aspects of the present disclosure are directed to systems, methods, devices, and processes for thermally treating a semiconductor substrate.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to thermal imaging of heat sources for more precisely measuring temperatures of workpieces, such as semiconductor workpieces, opto-electronic workpieces, flat panel displays, or other suitable workpieces. The workpiece materials can include, for instance, silicon, silicon germanium, glass, plastic, or other suitable material. In some embodiments, the workpieces can be semiconductor wafers. The thermal imaging of heat sources can be used in various thermal processing systems that can implement a variety of workpiece manufacturing processes, including, but not limited to vacuum anneal processes, rapid thermal processes, etc. The thermal imaging of heat sources can also be applied to directly detect conditions of the heat sources (e.g., heat source failure detections, heat source quality issue detections, detections of changes in heat source physical shapes, etc.).

Rapid thermal processing (RTP) is a useful semiconductor device fabrication technology. RTP requires accurate measurements of workpiece temperatures and a precise workpiece temperature control. Rapid workpiece heating can be accomplished by dynamic control of heat sources, such as heating lamps (e.g., incandescent lamps) positioned at one side or both sides of the workpiece. In system operation, heat source temperatures can exceed 2,000° C. to generate irradiations for rapid workpiece heating. At a heat-source operating temperature, a significant portion of an input power of the heat sources can be also converted to heat, and a heat dissipation management can be key to lifetimes of the heat sources.

Heat sources can be in round, linear or other shapes. In some configurations, round-shape heat sources (e.g., round incandescent light bulbs, etc.) can be positioned in a close-packed (e.g., honeycomb, etc.) configuration with physical barriers in between. A confinement of individual heat sources can prevent cross heating between the heat sources. However, the confinement can cause issues in heat dissipation of the close-packed configuration to reduce lifetimes of the round-shape heat sources. In another configuration, linear heat sources can be positioned in parallel to each other with open space in between. Heat dissipation of this open-space configuration can be efficient. However, there is considerable cross heating between the linear heat sources.

In RTP systems, a workpiece temperature can be measured by an infrared pyrometer having a field of view of the workpiece. Challenges in accurate measurements of workpiece temperatures can include heat source irradiation reflected from the backside of the workpiece or scattered from other components inside an RTP chamber, and workpiece backside emissivity. For different device fabrications, different RTP processes can result in different workpiece backside emissivities. In addition, thin film materials on the workpiece backside can undergo structure (e.g., crystalline structure, grain size, etc.) changes towards an emissivity change during the RTP processes.

To overcome these challenges, several approaches can be applied. For instance, one side of the workpiece can be heated, and the pyrometer can be housed in a cavity to aim at the other side of the workpiece. As another example, a broadband heat source (e.g., an incandescent lamp, etc.) can be replaced with a monochromatic heat source (e.g., a light-emitting diode LED, a laser diode, or other monochromatic heat source). The pyrometer can monitor the temperature of the workpiece at a different wavelength from a wavelength range of the monochromatic heat source.

In some examples, the workpiece temperature can be determined based on a cancellation of heat source irradiation from one or more pyrometer measurements using a chamber optical model. The chamber optical model can estimate heat source irradiation and optical paths of the heat source irradiation in the RTP chamber. The heat source irradiation can vary dynamically in the RTP process, and can change significantly at a short time scale of milliseconds. Transient irradiation from each heat source can be affected by several factors, such as heat source current, heat source temperature hysteresis, heat source array configuration, cross heating between the heat sources, and optical transmission and/or reflection in the RTP chamber. The heat source irradiation can be estimated based on a combination of factors above. However, due to variations between the heat sources and heat source decays throughout lifetimes of the heat sources, it can be difficult to determine workpiece temperature. According to example aspects of the present disclosure, thermal imaging for the heat sources can be used to more precisely measure the workpiece temperature.

For instance, example embodiments of the present disclosure are directed to thermal processing apparatus. The thermal processing apparatus can include a camera(s) (e.g., a complementary metal-oxide-semiconductor CMOS, or any other suitable imaging device that can capture thermal images) to capture one or more images of thermal radiation of the heat sources.

In some embodiments, the camera(s) can have a field of view of the heat source(s) in the thermal processing apparatus. The camera(s) can be configured to capture a direct thermal image of the heat sources. The heat sources can have an open heat source array design and the camera(s) can have a line-of-sight to the heat sources, e.g., from a glancing angle in the RTP systems. Comparing with other approaches to construct a heat source irradiation model, a direct thermal imaging of the heat sources can be both straight forward and accurate. The direct thermal imaging can map out the heat source irradiation in real-time, and can handle variations between the heat sources and heat source decays throughout lifetimes of the heat sources. Furthermore, thermal images can show any thermal gradient within a heat source (e.g., from one end to center to the other end for a linear incandescent lamp).

In some embodiments, the camera(s) can have a refresh rate greater than about 1,000 frames per second (fps), i.e. an image every 1 millisecond (ms). In some embodiments the camera(s) can have a refresh rate greater than about 10,000 frames per second (fps), i.e. an image every 0.1 ms.

In some embodiments, the camera(s) can be equipped with a high angle lens, and the high angle lens can have a focal length less than about 30 centimeters (cm). In some embodiments, the focal length of the camera(s) can be less than about 10 cm.

In some embodiments, the camera(s) can be equipped with a wavelength filter. The wavelength filter can transmit infrared wavelengths in an infrared range of about 700 nanometers to about 1 millimeter to the camera(s) and can block wavelengths outside of the infrared range.

In some embodiments, the camera(s) can be equipped with a decay filter (also referred to as an energy filter). The decay filter can reduce a signal saturation of the camera(s) due to operation of the heat sources (e.g., avoiding camera signal saturation at the highest operation temperature of the heat sources or at the highest heat source irradiation signal).

In some embodiments, the camera(s) can be connected to one or more devices (e.g., control devices, computing devices, etc.) to implement an image analyzer through a high-speed data transmission cable (e.g., Ethernet cable, etc.). The one or more devices can include one or more processors and one or more memory devices. The one or more memory devices can store computer-readable instructions that when executed by the one or more processors cause the one or more processors to implement image analyzer functionality as described herein.

In some embodiments, the thermal image(s) of the heat sources can be provided as an input to a chamber thermal model. The chamber thermal model can estimate an irradiation flux on workpiece and/or the temperature of the workpiece. In some embodiments, a chamber optical model can be part of the chamber thermal model and/or can provide outputs to the chamber thermal model. In some embodiments, both the thermal image(s) of the heat sources and the RTP optical model can be inputs to the chamber thermal model. The irradiation flux on workpiece can describe heat irradiations from the workpiece. Examples of the irradiation flux on workpiece can include a workpiece absorption (e.g., workpiece thermal radiation) describing an energy from the heat source irradiation absorbed by the workpiece, a workpiece reflection describing an energy from the heat source irradiation reflected by the workpiece, a chamber scattering describing an energy from the heat source irradiation scattered by the processing chamber, a transmission energy describing an energy from the heat source irradiation transmitted by the workpiece, or any other suitable energy on the workpiece.

In some embodiments, the thermal processing apparatus can include one or more pyrometers that can capture the irradiation flux on workpiece. The one or more pyrometers can have a field of view of the workpiece to capture one or more pyrometer measurements associated with the irradiation flux on workpiece. The workpiece temperature can be determined based on the chamber thermal model and one or more pyrometer measurements. For example, the one or more pyrometer measurements can be fed into the chamber thermal model to determine the workpiece temperature.

In some embodiments, the workpiece temperature can be determined based on the chamber thermal model, the one or more pyrometer measurements, and workpiece emissivity. The workpiece emissivity can describe a ratio of an energy radiated from the workpiece's surface to that radiated from a blackbody at the same temperature and wavelength, and under the same viewing conditions (e.g., viewing angles, viewing distances, etc.). For example, an emissivity of the blackbody is 1.00, and the workpiece emissivity can be between 0 and 1.00. In some embodiments, the thermal processing apparatus can include one or more emissivity sensors to measure the workpiece emissivity. The measured workpiece emissivity can be fed into the chamber thermal model to further deconvolute the workpiece reflection and the workpiece absorption to derive the workpiece temperature.

Example embodiments of the present disclosure are directed to a method for determining the temperature of the workpiece in the thermal processing chamber. The method can include heating the workpiece with the heat sources, capturing one or more images of thermal radiation of the heat sources with the camera(s), accessing a thermal model associated with the thermal processing chamber based at least in part on the one or more images of thermal radiation, obtaining one or more outputs (e.g., the irradiation flux on workpiece, etc.) of the thermal model based at least in part on the one or more images of thermal radiation, and determining the temperature of the workpiece based at least in part on the one or more outputs. In some embodiments, the thermal model can determine the temperature of the workpiece based at least in part on the one or more outputs. In some embodiments, the method can include determining the temperature of the workpiece based at least in part on the one or more outputs and the one or more pyrometer measurements. In some embodiments, the method can include determining the temperature of the workpiece based at least in part on the one or more outputs, the one or more pyrometer measurements, and the workpiece emissivity.

Example embodiments of the present disclosure are directed to a method for calibrating the camera(s) in the thermal processing chamber. In some embodiments, the RTP chamber can be equipped with a heat source current sensor(s) configured to measure current in a filament associated with a heat source. Heat source resistivity can be calculated based on voltage across and current going through the heat source (e.g., through a filament of the heat source, etc.). Heat source temperature can be determined from the heat source resistivity increase (e.g., the heat source resistivity increase from room temperature, etc.), and heat source irradiation can be determined from the heat source temperature and the heat source resistivity. The heat source irradiation can be used to calibrate a camera sensitivity of the camera(s).

In some embodiments, the camera sensitivity calibration can be carried out during a time period when no workpiece is located in the RTP chamber. In some embodiments, the camera sensitivity calibration can be carried out for only a single illuminated heat source a time. For example, the camera sensitivity calibration can be carried out one heat source at a time to collect multiple calibration points. As such, cross heating between heat sources can be avoided at the same time. In some embodiments, the camera sensitivity calibration can be carried out at steady state (e.g., the steady state referring to steady heat source voltage and/or heat source current during a time period) to avoid any transient effect (e.g. heat source temperature variation, etc.). In some embodiments, the camera sensitivity calibration can be carried out at different steady states to gather different calibration points. For example, for each steady state, one or more calibration points can be collected.

Variations and modifications can be made to these example embodiments of the present disclosure. As used in the specification, the singular forms "a," "and," and "the" include plural referents unless the context clearly dictates otherwise. The use of "first," "second," "third," and "fourth" are used as identifiers and are directed to an order of processing. Example aspects may be discussed with reference to a "substrate," "wafer," or "workpiece" for purposes of illustration and discussion. Those of ordinary skill in the art, using the disclosures provided herein, will understand that example aspects of the present disclosure can be used with any suitable workpiece. The use of the term "about" in conjunction with a numerical value refers to within 20% of the stated numerical value.

Figure 1:
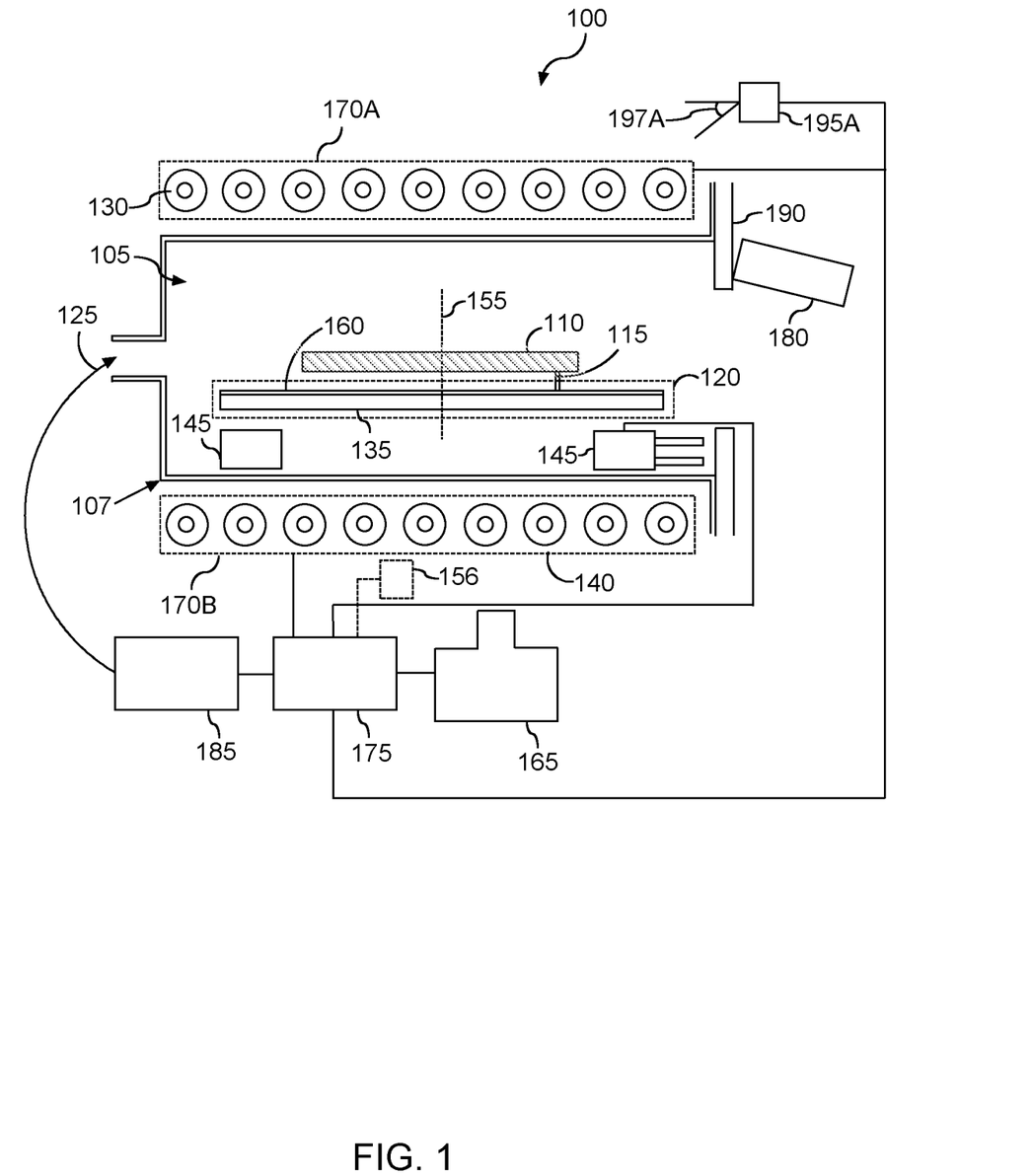
FIG. 1 depicts an example thermal processing system having a camera for thermal imaging of heat sources according to example embodiments of the present disclosure.

With reference now to the FIGS., example embodiments of the present disclosure will now be discussed in detail. FIG. 1 depicts an example RTP system 100 having a camera 195A for thermal imaging of heat sources 170A and 170B according to example embodiments of the present disclosure. As illustrated, the RTP system 100 includes a processing chamber 105, a workpiece 110, a workpiece support 120, heat source arrays 170A and 170B, air bearings 145, a pyrometer 165, a controller 175, a door 180, a gas flow controller 185, and the camera 195A.

In some embodiments, the RTP system 100 can include additional components, such as one or more optional emissivity sensors 156 to detect workpiece emissivity, one or more current sensors to detect current of the heat sources, or other suitable components. In some embodiments, the one or more emissivity sensors 156 can aim at a backside of the workpiece 110 to obtain signals indicative of emissivity of the workpiece 110. In some embodiments, one or more of the heat source can be associated with a current sensor that can measure current in a filament associated with that heat source. The current can be used to estimate irradiation from the heat source.

The workpiece 110 to be processed can be supported in the processing chamber 105 (e.g., a quartz chamber) by the workpiece support 120. The workpiece support 120 can support the workpiece 110 during thermal processing. The workpiece support 120 can include a rotatable base 135 and one or more support pins 115 (only one shown). The support pins 115 and the rotatable base 135 can transmit heat from the heat sources 170B. The support pins 115 and the rotatable base 135 can be made of quartz. The rotatable base 135 can rotate the workpiece 110 at a defined rotation orientation and at a defined rotation speed. The rotatable base 135 can be supported by the air bearings 145. The gas flow 150 impinging on the rotatable base 135 can cause the rotatable base 135 to rotate about an axis 155.

A guard ring (not shown) can be used to lessen edge effects of radiation from one or more edges of the workpiece 110. An end plate 190 seals to the processing chamber 105, and the door 180 can allow entry of the workpiece 110 and, when closed, can allow the processing chamber 105 to be sealed and a process gas 125 to be introduced from the gas flow controller 185 into the processing chamber 105. The process gas 125 can include inert gas that does not react with the workpiece 110, and/or the process gas 125 can include a reactive gas that reacts with the material of the workpiece 110 (e.g. a semiconductor wafer, etc.) to form a layer of on the workpiece 110. The process gas 125 can be a gas that can contain a silicon compound that reacts at a heated surface of the workpiece 110 being processed to form a layer on the heated surface without consuming any material from the surface of the workpiece 110. When the process gas 125 reacts to form a layer on the surface, the process is called rapid thermal—chemical vapor deposition (RT-CVD). In some embodiments, an electrical current can be run through the atmosphere in the RTP system 100 to produce ions that are reactive with or at the surface, and to impart extra energy to the surface by bombarding the surface with energetic ions.

The two heat source arrays 170A and 170B are shown on either side of the workpiece 110. Each heat source array can include a plurality of heat sources (e.g., a heat source 130 of the heat source array 170A, a heat source 140 of the heat source array 170B). Examples of a heat source can include a lamp (e.g., an incandescent lamp, etc.), a light-emitting diode LED, a laser diode, other suitable broadband heat source, or other suitable monochromatic heat source. Each heat source can be in round, linear or other shapes. In some embodiments, the heat source arrays 170A and 170B can have the same configurations. In some implementations, the heat source arrays 170A and 170B can have linear heat sources that can be positioned in parallel to each other with open space in between. In some implementations, the heat sources arrays 170A and 170B can have round-shape heat sources that can be positioned in a close-packed (e.g., honeycomb, etc.) configuration with physical barriers in between. In some embodiments, the heat source arrays 170A and 170B can have different configurations. The heat source array 170A can have the linear heat sources, and the heat source array 170B can have the round-shape heat sources, or vice versa.

The heat source arrays 170A and 170B are discussed as having a plurality of heat sources. However, only a single heat source can be used without deviating from the scope of the present disclosure. Moreover, in some embodiments, the apparatus 100 can include only the heat source array 170A. In some embodiments, the apparatus 100 can include only the heat source array 170B. In some embodiments, the apparatus 100 can include both arrays 170A and 170B.

In some embodiments, the heat source array 170A can have an open heat source array design such that the camera 195A can have a field of view having a line-of-sight to the heat source array 170A. For example, the camera 195A can capture one or more thermal images of the heat source array 170A from a glancing angle 197A.

The camera 195A can capture one or more images of thermal radiation of the heat source array 170A during thermal treatment of the workpiece 110. The camera 195A can have a field of view having a line-of-sight to the heat source array 170A. Examples of the camera 195A can include a complementary metal-oxide-semiconductor CMOS camera, or other suitable imaging device that can capture thermal images. The captured images can depict or can be analyzed reveal variations between heat sources of the heat source array 170A and heat source decays over time. In some embodiments, the camera 195A can capture thermal images that depict multiple heat sources of the heat source array 170A, such as a subset of heat sources included in the heat source array 170A, all the heat sources included in the heat source array 170A, etc. In some embodiments, the camera 195A can capture thermal images that depict only a single heat source of the heat source array 170A.

In some embodiments, the camera 195A can have a refresh rate greater than about 1,000 frames per second (fps), i.e. an image every 1 millisecond (ms). In some embodiments the camera 195A can have a refresh rate greater than about 10,000 frames per second (fps), i.e. an image every 0.1 ms.

In some embodiments, the camera 195A can be equipped with a high angle lens, and the high angle lens can have a focal length less than about 30 centimeters (cm). In some embodiments, the focal length of the camera 195A can be less than about 10 cm.

In some embodiments, the camera 195A can be equipped with a wavelength filter. The wavelength filter can transmit infrared wavelengths in an infrared range of about 700 nanometers to about 1 millimeter to the camera 195A and to block wavelengths outside of the infrared range.

In some embodiments, the camera 195A can be equipped with a decay filter (also referred to as an energy filter) to reduce a signal saturation of the camera(s) at the highest operation temperature of the heat sources, or at the highest heat source irradiation signal.

In some embodiments, the camera 195A can be connected to one or more devices (e.g., the controller 175, computing devices, etc.) to implement an image analyzer through a high-speed data transmission cable (e.g., Ethernet cable, etc.). The image analyzer can include computer logic that when executed by one or more processors cause the processors to perform digital image analysis. For instance, the image analyzer can include one or more computer-readable instructions stored in one or more memory devices. The computer-readable instructions when executed by the one or more processors cause the one or more processors to provide image analysis functionality described herein. The computer-readable instructions can be implemented in software and/or hardware.

The image analyzer can analyze the images captured by the camera 195A to estimate various conditions of the heat sources in the heat source array 170. A condition can indicate if the heat sources can perform well. Examples of the condition can include a condition indicative of heat source failure, a condition indicative of heat source quality issue, a condition indicative of any changes in heat source physical shape, a condition indicative of variations between the heat sources, a condition indicative of a heat source decay throughout its lifetime, or other suitable condition. In some embodiments, the controller 175 can perform functionality of the image analyzer. In some embodiments, the controller 175 can include computer logic associated with the image analyzer. As such, the estimated conditions can be used to perform heat source heath check, and/or can be fed into a thermal model to determine a temperature of the workpiece 110 as further described below.

The controller 175 (e.g., a computer, microcontroller(s), other control device(s), etc.) can include one or more processors and one or more memory devices. The one or more memory devices can store computer-readable instructions that when executed by the one or more processors cause the one or more processors to perform operations, such as implementing the image analyzer functionality, accessing a thermal model, controlling the rotatable base 135, the temperature measuring system (e.g., the pyrometer 165), the heat source arrays 170A and 170B, the door 180, the gas flow controller 185, and the camera 195A, calibrating the camera 195A, or other suitable operation.

In some embodiments, the controller 175 can control the rotatable base 135 to rotate at a controlled orientation and at a controlled speed. The controller 175 can control the pyrometer 165 to perform one or more pyrometer measurements. The controller 175 can control the heat source arrays 170A and 170B to heat the workpiece 110 and can adjust powers for the heat source arrays 170A and 170B based on the temperature of the workpiece 110. The controller 175 can open the door 180 when the workpiece 110 is entering the processing chamber 105 and can close the door 180 when the workpiece 110 has entered the processing chamber 105. The controller 175 can control the gas flow controller 185 to introduce the process gas 125 into the processing chamber 105 at a controlled flow rate. The controller 175 can control the camera 195A to capture one or more thermal images of thermal radiation of the heat source array 170A and can store the one or more images in the memory devices.

In some embodiments, the controller 175 can perform operations associated with a thermal model stored in the memory devices to determine the temperature of the workpiece 110. The thermal model can estimate and output an irradiation flux associated with workpiece that can describe heat irradiations from the workpiece 110. Examples of the irradiation flux associated with the workpiece can include a workpiece absorption (e.g., workpiece thermal radiation) describing an energy from the heat source irradiation absorbed by the workpiece 110, a workpiece reflection describing an energy from the heat source irradiation reflected by the workpiece 110, a chamber scattering describing an energy from the heat source irradiation scattered by the processing chamber 105, a transmission energy describing an energy from the heat source irradiation transmitted by the workpiece 110, or any other suitable energy on the workpiece 110.

In some embodiments, the thermal images of the heat source array 170A can be provided as an input to the thermal model. In some embodiments, the estimated conditions of the image analyzer can be provided as an input to the thermal model. In some embodiments, a chamber optical model can be part of the thermal model or can provide outputs to the thermal model. The chamber optical model can estimate heat source irradiation and optical paths of the heat source irradiation in the processing chamber 105. In some embodiments, both the thermal images (and/or the estimated conditions) and the chamber optical model can be inputs to the thermal model. In some embodiments, the one or more pyrometer measurements can be fed into the thermal model to determine the temperature of the workpiece 110. In some embodiments, a workpiece emissivity detected by the one or more emissivity sensors can be fed into the thermal model to determine the temperature of the workpiece 110.

Figure 2:
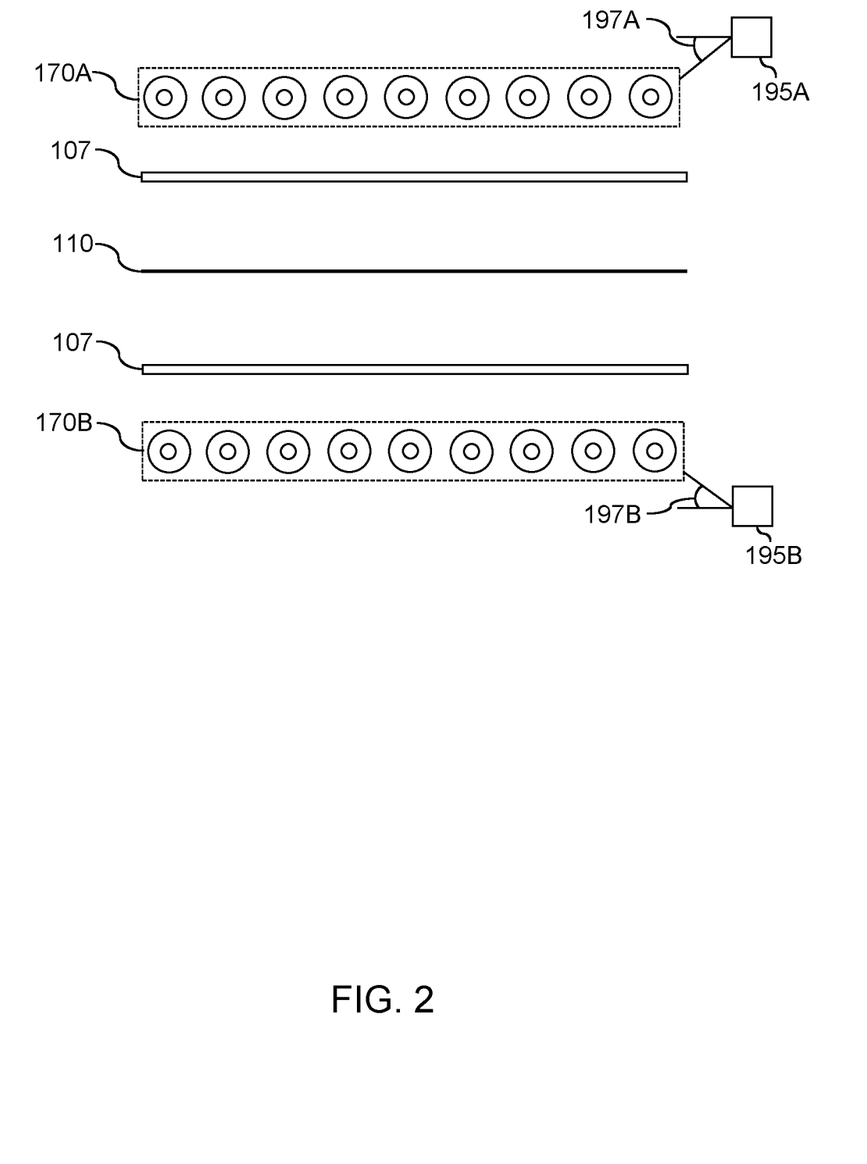
FIG. 2 depicts example thermal imaging of heat sources according to example embodiments of the present disclosure.

FIG. 2 depicts example thermal imaging of heat sources 170A and 170B according to example embodiments of the present disclosure. As shown in FIG. 2, the heat source 170B can have an open heat source array design. A camera 195B can have a field of view having a line-of-sight to the heat source array 170B. The camera 195B can capture one or more images of thermal radiation of the heat source array 170B from a glancing angle 197B. In some embodiments, the camera 195B is an example embodiment of the camera 195A (in FIG. 1).

The present disclosure is discussed with the controller 175 to control the camera 195A for purposes of illustration and discussion. Those of ordinary skill in the art, using the disclosures provided herein, will understand that the controller 175 can control the camera 195B without deviating from the scope of the present disclosure. For example, the controller 175 can provide the one or more images captured by the camera 195B as an input to the thermal model in addition to the one or more images captured by the camera 195B.

Figure 3:
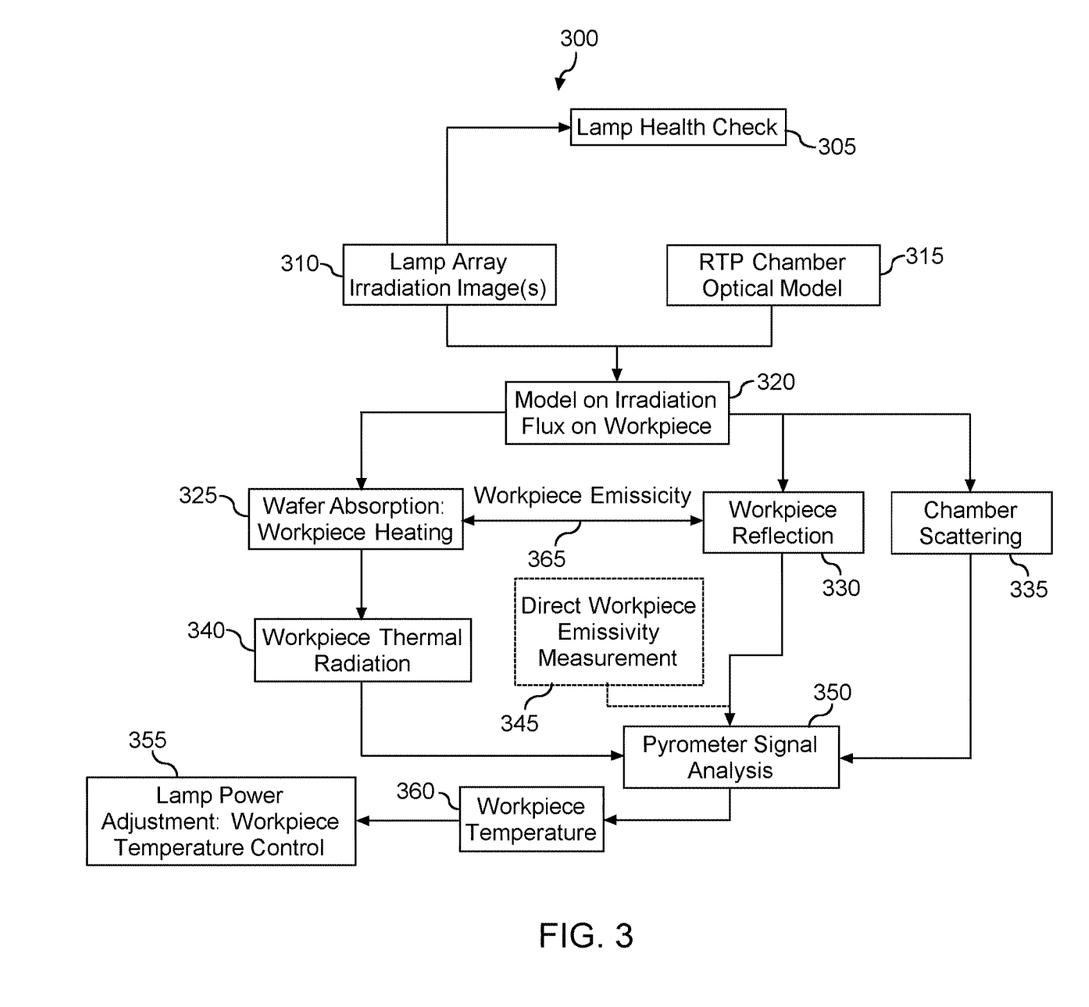
FIG. 3 depicts an example block diagram of workpiece temperature control in a thermal processing system according to example embodiments of the present disclosure.

FIG. 3 depicts an example block diagram of a workpiece temperature control 300 in the RTP system 100 according to example embodiments of the present disclosure. In some embodiments, the controller 175 (in FIG. 1) can implement the workpiece temperature control 300. As shown in FIG. 3, lamp heath check 305 (e.g., heat source failure detections, heat source quality issue detections, detections of changes in heat source physical shapes, etc.) can be based on lamp array irradiation image(s) 310 captured by the camera 195A (in FIG. 1) and/or the camera 195B (in FIG. 2). More particularly, images captured by the camera 195A and/or 195B can be analyzed (e.g., using an image analyzer) to identify conditions associated with lamp health, such as lamp failure, lamp decay, changes in physical shapes, etc.).

When certain lamp health condition(s) have been detected, the controller can implement a control action to address the lamp health condition(s). The control action can include providing a notification and/or alert to an operator (e.g., via a user interface, alarm, etc.). The control action can include disabling operation of the apparatus until the lamp health condition(s) have been resolved (e.g., a lamp has been replaced, etc.).

Referring to FIG. 3, the lamp array irradiation image(s) 310 and an RTP chamber optical model 315 can be inputs to a thermal model associated with radiation flux on workpiece 320 (also referred to as the thermal model described above). The thermal model 320 can output workpiece absorption 325, workpiece reflection 330, and chamber scattering 335. The workpiece absorption 320 can be converted into workpiece thermal radiation 340 that can be used to determine workpiece temperature 360. Pyrometer signal analysis 350 can extract the workpiece temperature 360 from the workpiece reflection 330, the chamber scattering 335, and the workpiece thermal radiation 340. In some embodiments, the pyrometer signal analysis 350 can be part of the model 320. In some embodiments, the one or more pyrometer measurements can be fed into the model 320 to extract the workpiece temperature 360 from the workpiece reflection 330, the chamber scattering 335, and the workpiece thermal radiation 340.

In some embodiments, direct workpiece emissivity measurement 345 can be performed by the one or more emissivity sensors described above. The direct workpiece emissivity measurement 345 can facilitate the pyrometer signal analysis 350 to further extract the workpiece temperature 360. In some embodiments, the workpiece absorption 325 and the workpiece reflection 330 can be associated with workpiece emissivity 365. The direct workpiece emissivity measurement 345 can be fed into the model 320 to further deconvolute the workpiece absorption 325 and the workpiece reflection 330 to extract the workpiece temperature 360.

The workpiece temperature 360 can be used (e.g., by a controller) for control of the lamp source arrays. For instance, lamp power adjustment 355 can adjust the heat source arrays 170A and 170B based on the workpiece temperature 360. As an example, if the workpiece temperature 360 is determined to be too low, the lamp source arrays 170A and/or 170B can be controlled to provide more heat to the workpiece. If the workpiece temperature 360 is determined to be too high, the lamp source arrays 170A and/or 170B can be controlled to provide less heat to the workpiece.

Figure 4:
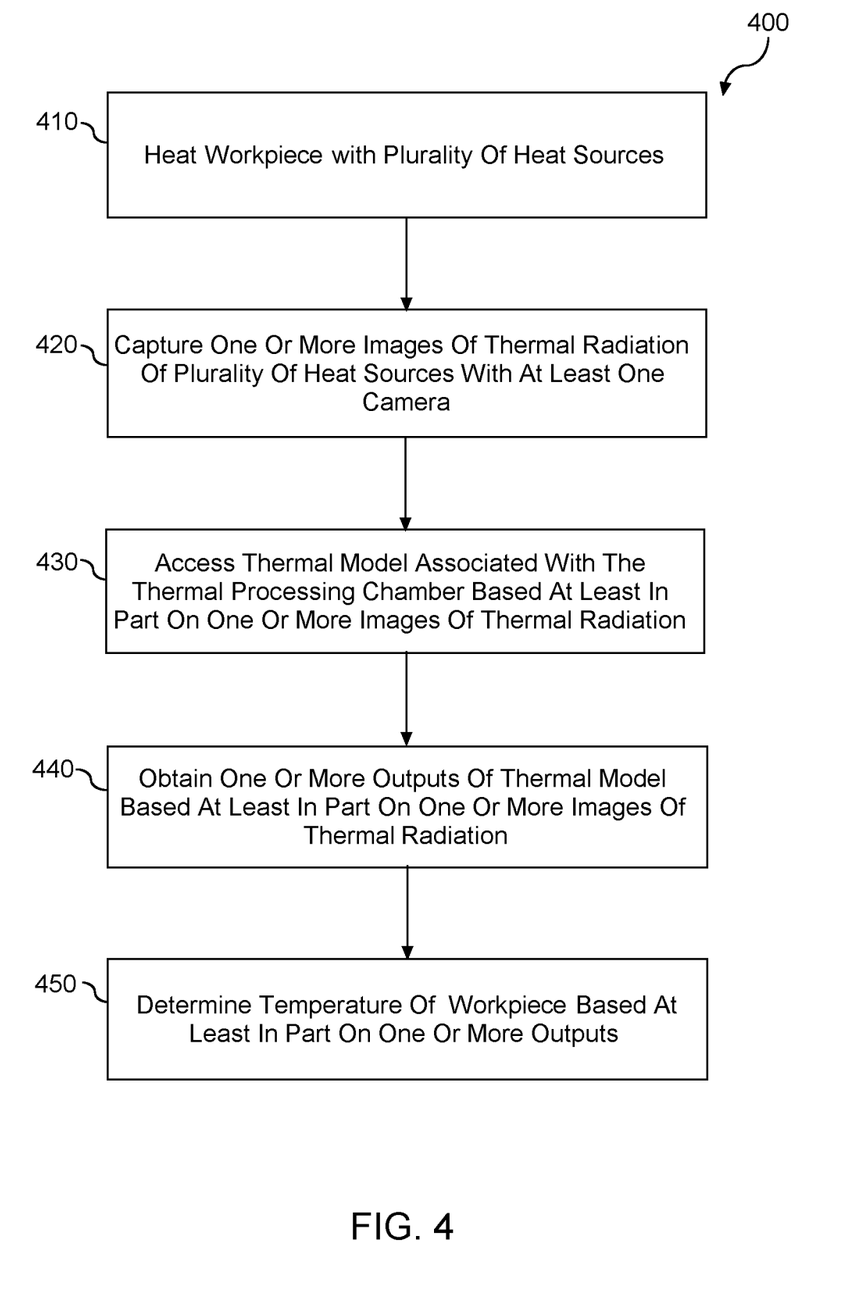
FIG. 4 depicts a flow diagram of an example process for determining a temperate of a workpiece in a thermal processing chamber according to example embodiments of the present disclosure.

FIG. 4 depicts a flow diagram of a process (400) for determining a temperature of a workpiece in a thermal processing chamber according to example embodiments of the present disclosure. The process (400) can be implemented using the RTP system 100 of FIG. 1. However, as will be discussed in detail below, the process (400) according to example aspects of the present disclosure can be implemented using other thermal processing systems without deviating from the scope of the present disclosure. FIG. 4 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. In addition, various additional steps (not illustrated) can be performed without deviating from the scope of the present disclosure.

At (410), the process can include heating a workpiece with a plurality of heat sources. For example, in the example embodiment of FIG. 1, the controller 175 can control the heat source arrays 170A and 170B to heat the workpiece 110 through the rotatable base 135 and the support bins 115.

At (420), the process can include capturing one or more images of thermal radiation of the plurality of heat sources with at least one camera. For example, in the example embodiments of FIGS. 1 and 2, the controller 175 can control the cameras 195A and 195B to capture one or more images of thermal radiation of the heat source arrays 170A and 170B, respectively.

At (430), the process can include accessing a thermal model associated with a thermal processing chamber based at least in part on the one or more images of thermal radiation. For example, in the example embodiments of FIGS. 1 and 3, the controller 175 can provide the lamp irradiation image 310 and/or outputs the RTP chamber optical model 315 as inputs to the model 320.

At (440), the process can include obtaining one or more outputs of the thermal model based at least in part on the one or more images of thermal radiation. For example, in the example embodiments of FIGS. 1 and 3, the model 320 can output the workpiece absorption 325 and/or the workpiece thermal radiation 340, the workpiece reflection 330, and the chamber scattering 335.

At (450), the process can include determining the temperature of the workpiece based at least in part on the one or more outputs. For example, in the example embodiments of FIGS. 1 and 3, the controller 175 can extract the workpiece temperature 360 from the pyrometer signal analysis 350 based on the workpiece reflection 330, the chamber scattering 335, and the workpiece thermal radiation 340. In some embodiments, one or more pyrometer measurements can be fed into the model 320 to extract the workpiece temperature 360. In some embodiments, the controller 175 can use a direct workpiece emissivity measurement 345 with the pyrometer signal analysis 350 and/or the model 320 to further extract the workpiece temperature 360.

Referring to FIGS. 1 and 2, in some embodiments, the controller 175 can calibrate the camera 195A and/or the camera 195B based on a comparison between the one or more images of thermal radiation of the respective camera and one or more reference signals indicative of irradiation of the heat source array 170A and/or the heat source array 170B. A reference signal indicative of irradiation can describe a signal that indicates the irradiation that a heat source is producing. The reference signal can be obtained from a heat source manufacturer. In some embodiments, the reference signal can be determined from the one or more current sensors measuring a current associated with the heat source. In some embodiments, the controller 175 can calculate a difference between a thermal image and a corresponding reference signal. The controller 175 can adjust one or more camera parameters (e.g., exposure time, detector gain, acquisition time, etc.) based on the difference.

In some embodiments, the controller 175 can calibrate the camera 195A and/or the camera 195B during a time period when no workpiece is located in the processing chamber 105. In some embodiments, the controller 175 can calibrate the camera 195A and/or the camera 195B for only a single illuminated heat source a time. For example, the controller 175 can turn on one heat source to illuminate at a time. The controller 175 can control the camera 195A and/or the camera 195B to capture a thermal image of the illuminated heat source, and can compare the thermal image of that heat source with a corresponding reference signal to calculate a difference. As such, cross heating between heat sources can be avoided at the same time. In some embodiments, the controller 175 can calibrate the camera 195A and/or the camera 195B at steady state (e.g., the steady state referring to steady heat source voltage and/or heat source current during a time period) to avoid any transient effect (e.g. heat source temperature variation, etc.). For example, the controller 175A can control the camera 195A and/or the camera 195B to capture a thermal image(s) of one or more heat sources when the one or more heat sources illuminate at steady state. In some embodiments, the controller 175 can calibrate the camera 195A and/or the camera 195B at different steady states. For example, for each steady state, the camera 195A can control the camera 195A and/or the camera 195B to capture a first thermal image(s) of one or more heat sources when the one or more heat sources illuminate at a first steady state, and to capture a second thermal image(s) of the one or more heat sources when the one or more heat sources illuminate at a second steady state, and so forth.

Figure 5:
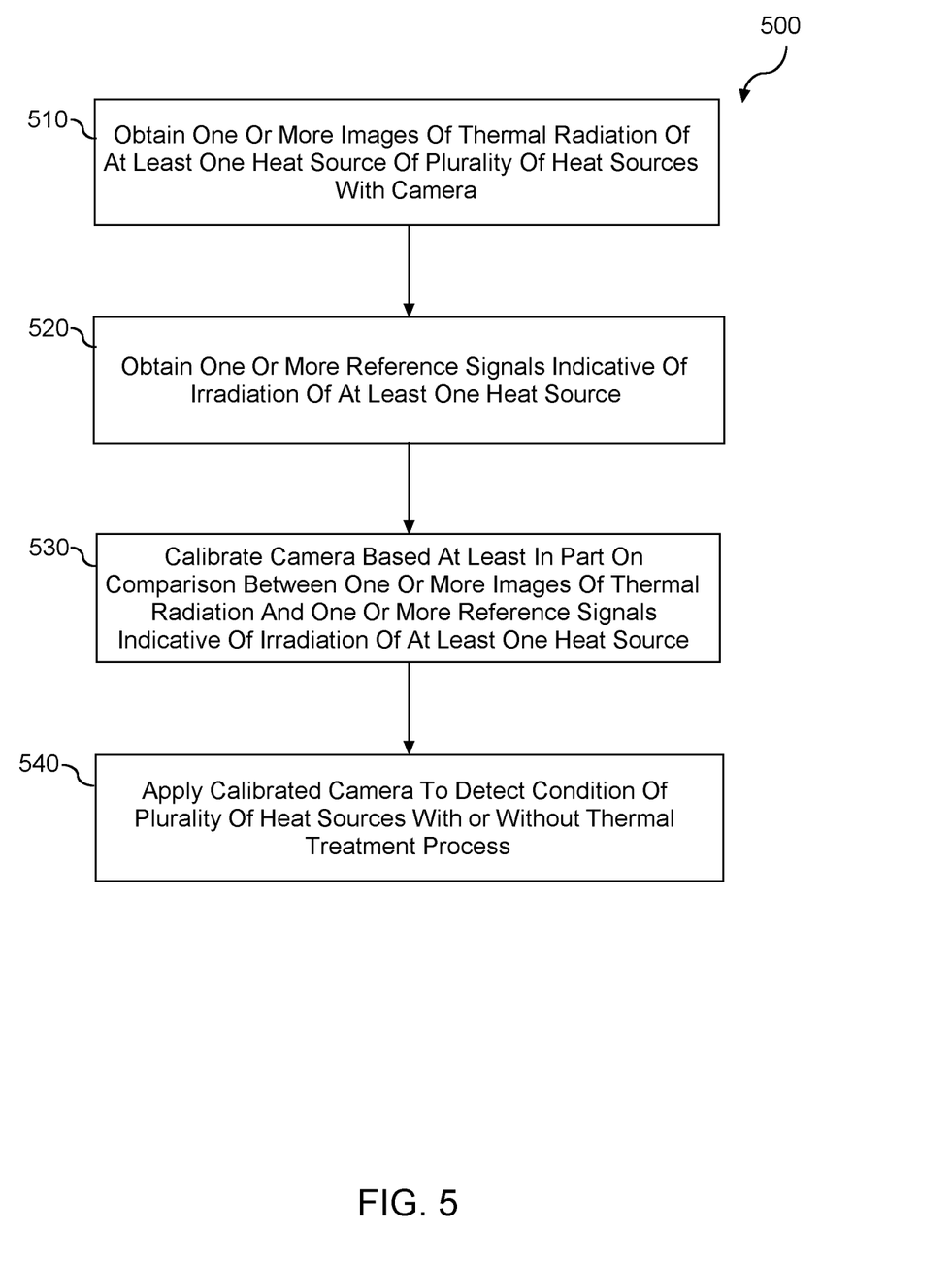
FIG. 5 depicts a flow diagram of a process for calibrating a camera in a thermal processing chamber according to example embodiments of the present disclosure.

FIG. 5 depicts a flow diagram of a process (500) for calibrating a camera in a thermal processing chamber according to example embodiments of the present disclosure. The process (500) can be implemented using the RTP system 100 of FIG. 1. However, as will be discussed in detail below, the process (500) according to example aspects of the present disclosure can be implemented using other thermal processing systems without deviating from the scope of the present disclosure. FIG. 5 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. In addition, various additional steps (not illustrated) can be performed without deviating from the scope of the present disclosure.

At (510), the process can include obtaining one or more images of thermal radiation of at least one heat source of a plurality of heat sources with a camera. For example, in the example embodiments of FIGS. 1 and 2, the cameras 195A and 195B can capture one or more images of thermal radiation of a single heat source and/or multiple heat sources of the heat source arrays 170A and 170B, respectively.

At (520), the process can include obtaining one or more reference signals indicative of irradiation of the at least one heat source. For example, in the example embodiment of FIG. 1, the controller 175 can obtain one or more reference signals from the memory devices of the controller 175. The memory devices can store the one or more reference signals from the heat source manufacturer.

In some embodiments, the controller 175 can determine one or more reference signals based on signals from the one or more current sensors and/or voltage sensors associated with the heat source. For instance, heat source resistivity can be calculated based on voltage across and current going through the heat source (e.g., through a filament of the heat source, etc.). Heat source temperature can be determined from the heat source resistivity increase (e.g., the heat source resistivity increase from room temperature, etc.), and heat source irradiation can be determined from the heat source temperature and the heat source resistivity.

At (530), the process can include calibrating the camera based at least in part on a comparison between the one or more images of thermal radiation and the one or more reference signals indicative of irradiation of the at least one heat source. For example, in the example embodiment of FIG. 1, the controller 175 can calculate a difference between a thermal image and a corresponding reference signal. The controller 175 can adjust one or more camera parameters (e.g., exposure time, detector gain, acquisition time, etc.) based on the difference.

At (540), the process can include applying the calibrated camera to detect condition of the plurality of heat sources with or without thermal treatment process. For example, in the example embodiments of FIGS. 1 and 3, the controller 175 can perform the lamp heath check 305 to detect conditions (e.g., heat source failure detections, heat source quality issue detections, detections of changes in heat source physical shapes, etc.) of the heat source arrays 170A and 170B with or without heating the workpiece 110.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A thermal processing apparatus, comprising:
    a processing chamber;
    a workpiece support;
    a plurality of heat sources disposed outside of the processing chamber, the plurality of heat sources configured to heat a workpiece in the processing chamber;
    at least one camera configured to capture one or more images of thermal radiation of the plurality of heat sources during thermal treatment of the workpiece; and
    a controller configured to perform operations, the operations comprising:
        providing the one or more images of thermal radiation as an input to a thermal model of the processing chamber;
        obtaining one or more outputs of the thermal model based at least in part on the input; and
        determining a temperature of the workpiece based at least in part on the one or more outputs of the thermal model.

2. The thermal processing apparatus of claim 1, wherein the at least one camera comprises a CMOS camera.

3. The thermal processing apparatus of claim 1, wherein the operations further comprise:
    obtaining one or more pyrometer measurements of the workpiece from at least one pyrometer; and
    determining the temperature of the workpiece based at least in part on the one or more pyrometer measurements and the one or more outputs of the thermal model.

4. The thermal processing apparatus of claim 1, wherein the at least one camera comprises a field of view having a line-of-sight to the plurality of heat sources.

5. The thermal processing apparatus of claim 1, wherein the at least one camera comprises a refresh rate greater than about 1000 frames per second.

6. The thermal processing apparatus of claim 1, wherein the at least one camera comprises a high angle lens, wherein the high angle lens has a focal length less than about 30 centimeters.

7. The thermal processing apparatus of claim 1, wherein the at least one camera comprises a wavelength filter.

8. The thermal processing apparatus of claim 1, further comprising:
    at least one current sensor configured to provide a signal indicative of irradiation of the plurality of heat sources,
    wherein the operations further comprise calibrating the at least one camera based at least in part on the signal indicative of irradiation of the plurality of heat sources.

9. The thermal processing apparatus of claim 3, further comprising:
    at least one emissivity sensor configured to measure an emissivity of the workpiece.

10. The thermal processing apparatus of claim 9, wherein the operations further comprise:
    providing the one or more pyrometer measurements as an input to the thermal model; and
    providing one or more emissivity measurements of the workpiece as an input to the thermal model.

11. A method for determining a temperature of a workpiece in a thermal processing chamber, comprising:
    heating the workpiece with a plurality of heat sources disposed outside of the thermal processing chamber;
    capturing one or more images of thermal radiation of the plurality of heat sources with at least one camera;
    providing the one or more images of thermal radiation as an input to a thermal model of the thermal processing chamber;
    obtaining one or more outputs of the thermal model based at least in part on the input; and
    determining the temperature of the workpiece based at least in part on the one or more outputs.

12. The method of claim 11, wherein the one or more outputs comprise one or more of: workpiece thermal radiation, workpiece reflection, or chamber scattering.

13. The method of claim 11, wherein determining the temperature of the workpiece based at least in part on the one or more outputs comprises:
    obtaining one or more pyrometer measurements of the workpiece from at least one pyrometer having a field of view of the workpiece;

determining the temperature of the workpiece based at least in part on the one or more outputs and the one or more pyrometer measurements.

14. The method of claim 11, further comprising adjusting a power of the plurality of heat sources based at least in part on the determined temperature of the workpiece.

15. The method of claim 11, further comprising:
obtaining a signal indicative of emissivity of the workpiece with at least one emissivity sensor;
determining the temperature of the workpiece based at least in part on the signal indicative of emissivity of the workpiece.

16. A method for calibrating a camera in a thermal processing chamber, the camera configured to capture images of thermal radiation of a plurality of heat sources used to heat a workpiece during thermal processing of the workpiece in the thermal processing chamber, the method comprising:
obtaining one or more images of thermal radiation of at least one heat source of the plurality of heat sources with the camera,
obtaining one or more reference signals indicative of irradiation of the at least one heat source;
calibrating the camera based at least in part on a comparison between the one or more images of thermal radiation and the one or more reference signals indicative of irradiation of the at least one heat source.

17. The method of claim 16, wherein obtaining the one or more reference signals are determined based at least in part on a signal from at least one current sensor configured to measure current in a filament associated with the at least one heat source.

18. The method of claim 16, wherein the one or more images of thermal radiation and the one or more reference signals are obtained during a time period when the at least one heat source is operating in steady state.

19. The method of claim 16, wherein the one or more images of thermal radiation and the one or more reference signals are obtained during a time period when no workpiece is located in the processing chamber.

20. The method of claim 16. wherein the one or more images of thermal radiation and the one or more reference signals are obtained for only a single illuminated heat source at a time.

* * * * *